Patented July 13, 1954

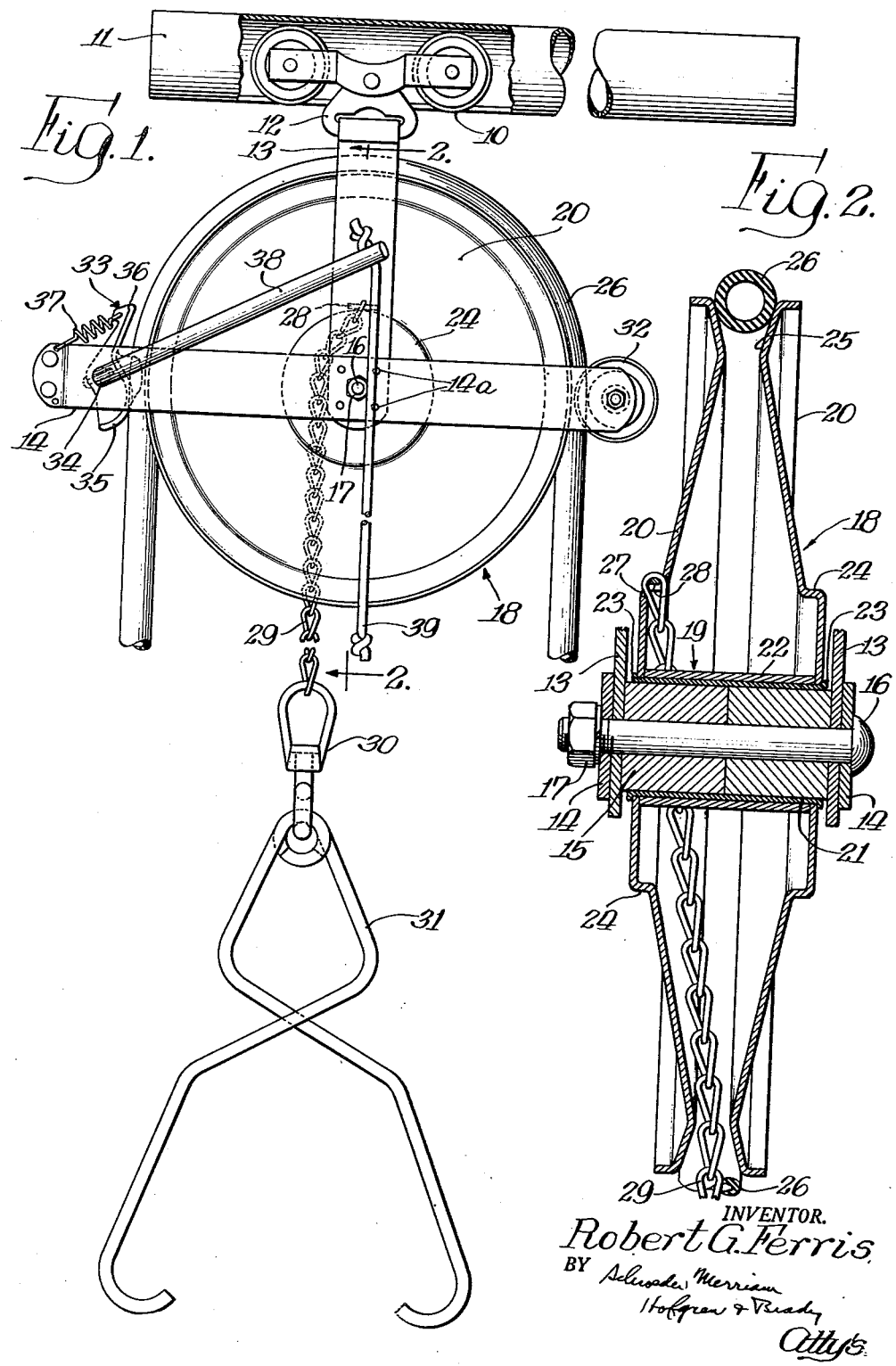

2,683,585

UNITED STATES PATENT OFFICE 2,683,585

MILK CAN HOIST

Robert Gaye Ferris, Harvard, Ill., assignor to Starline, Inc., a corporation of Illinois Application November 2, 1950, Serial No. 193,720

7 Claims. (Cl. 254—169)

This invention relates to a hoist for handling milk cans, and in particular it relates to an improved hoist of the windlass type.

In the handling of milk cans at a dairy farm, it is necessary that they be lifted several feet and lowered into a refrigerating chest in which the fresh milk is stored until it is picked up by a bulk milk truck. A full milk can weighs 100–150 pounds, and thus no great mechanical advantage is required to lift it; and the lift into the top opening cooling chest which is used on most dairy farms is only a matter of about two and one-half or three feet. Equipment for use in the average dairy farm must be inexpensive and rugged; and there have been numerous attempts to design such equipment for use by dairy farmers.

My improved milk can hoist is a wheel having a hub and with the wheel discs surrounding the hub spaced apart so that a chain, or equivalent element such as a cable or rope, may wind about the hub between the faces. The chain is secured to one of the wheel faces so that there is no torque on either the hub or the chain. At their periphery the two discs converge and then flare to form a groove for a friction belt by means of which the wheel is rotated to wind or unwind the chain. I have found that a continuous length of ordinary garden hose or milking machine hose provides a very satisfactory belt for hand operation. A friction brake is positioned to press the belt against the wheel to lock the wheel in any desired position.

The invention is illustrated in a preferred embodiment in the accompanying drawings in which:

Fig. 1 is a side elevation of a milk can hoist embodying the invention with parts of the support track broken away to show the carriage; and Fig. 2 is a section taken as indicated along the line 2—2 of Fig. 1.

Referring to the drawings in greater detail, a wheeled carriage 10 is mounted for movement in a tubular track 11 and has a hook 12 projecting downwardly through a slot in the bottom of the track. A U-shaped bracket 13 is suspended from the hook and has a pair of parallel cross arms 14 secured at its lower end. The cross arms 14 have apertures 14a which receive punched projections in the bracket 13, and a wooden bushing 15 is positioned between the cross arms. The bushing 15, cross arms 14, and bracket 13 have registering apertures to receive a bolt 16 which is held in place by a nut 17, the bolt and nut holding the assembly in compression and in frictional engagement.

A wheel 18 includes a hub 19 and a pair of spaced wheel discs 20. The hub includes a hub tube 21 and a spacer tube 22 which surrounds the hub tube 21 between the wheel discs 20, and said discs are held in place by flaring the ends 23 of the hub tube 21 to grip the discs firmly against the spacer tube 22.

Immediately adjacent the hub, the space between the wheel discs 20 occupies the full width of the hub to form a chain cavity defined by shoulders 24; and from said shoulders the discs 20 converge toward the periphery of the wheel, and flare adjacent the periphery to form a groove 25 for an endless rubber hose 26 which serves as a friction belt for rotating the wheel.

An aperture 27 is formed in one of the discs 20 on the shoulder 24, by striking the metal of the disc inwardly to form a supporting hook 28 to receive a chain 29 which hangs freely from the hook 28 between the discs 20. The free end of the chain extends out the bottom of the wheel, and has a link 30 to receive tongs 31 for hooking the handles of a milk can.

At one end of the cross arms 14 is journalled a small idler wheel 32 which is grooved to conform to the shape of the hose 26 and holds the hose firmly in the groove 25.

A brake member 33 lies between the cross arms 14 at the end opposite the idler wheel 32, and has a pin 34 which extends through apertures in said cross arms to permit pivoting of the brake member. Said brake member includes a shoe portion 35 bearing against the hose 26, and a spring receiving lug 36. A tension spring 37 extends between the lug 36 and one of the cross arms 14 to normally hold the brake in engagement with the hose 26. A brake release arm 38 is fastened to a projecting end of the pin 34 and carries at its free end a lanyard 39 which is adjacent the chain 29. To release the brake 33 it is merely necessary to pull on the lanyard.

The operation of the device is quite simple. The brake 33 is released by pulling on the lanyard 39 and the wheel is rotated by pulling on the hose 26 until the tongs 31 are at the right height to hook into the handles of a milk can. The brake may then be set, or the hose held stationary in one hand while the other hand is used to engage the tongs under the milk can handles. The brake 34 is then released if necessary, and the hose 26 is used to rotate the wheel 18 and wind the chain 29 about the hub 19. When the milk can is high enough to clear the top of the cooling chest, the brake may be set and the entire assembly may be moved along the track 11 on the carriage 10 until the can is over the cooling chest. The brake may then be released by pulling on the cord 39, and the can slowly lowered into the chest by permitting the hose 26 to move slowly with the wheel 18 in order to unwind the chain 29 from the hub.

The foregoing detailed description is given for clearness of understanding only and no unnecessary limitations should be understood therefrom, as modifications will be obvious to those skilled in the art.

I claim:

1. A hoist of the character described, comprising: a bracket having a non-metallic bushing; a sheet metal wheel having a tubular hub journalled on said non-metallic bushing and a pair of matching spaced annular discs surrounding the hub, and said spaced discs converging from adjacent the hub toward the rim of the wheel and flaring at the rim to form a circumferential groove; a fastening member stamped in one of said discs adjacent the hub, said fastening member being accessible from between the plates; a free hanging chain secured at one end to said fastening member so as to wind upon the hub between said discs when the wheel is rotated; an endless rubber hose in the groove on the rim of the wheel for rotating the wheel in either direction; and a movable friction brake positioned to bear on the hose to lock the wheel against rotation.

2. A hoist of the character described, comprising: a rotatably mounted wheel having a hub and a pair of spaced discs projecting radially therefrom, said discs converging from adjacent the hub toward their periphery and flaring adjacent their rims to form an open bottom groove for an endless friction belt; a load chain secured between said discs to wind on the hub when the wheel is rotated and hanging free through the open bottom of said groove; an endless friction belt supported in said groove for rotating the wheel in either direction; and brake means to control rotation of the wheel.

3. The hoist of claim 2 in which the portions of the discs adjacent the hub are generally perpendicular to the hub and have converging annular shoulders which define a chain cavity surrounding the hub.

4. The hoist of claim 3 wherein the chain is fastened to a disc at its shoulder.

5. The hoist of claim 2 wherein the endless friction belt is rubber hose.

6. A hoist comprising a sheave mounted for rotation, said sheave comprising a pair of laterally spaced plates having hub and rim portions, the hub portions being spaced relatively wide apart and the rim portions having a relatively narrow spacing, a drum positioned between said plates for rotation therewith, a flexible hoisting element having an end secured to the sheave to be wound onto said drum during rotation thereof, said flexible element having a portion thereof extending between the plates and projecting below said sheave for connection to an object to be lifted, a circumferentially extending groove at the outer periphery of said sheave, said groove being formed by circumferentially extending rim sections of the rim portions, the rim sections diverging outwardly relative to the hub, and means for rotating said sheave, said means including a flexible endless member having a portion engaging said groove in driving relation, said endless member having a loop portion extending below said sheave.

7. A hoist of the character described, comprising: a rotatably mounted wheel having a hub and a pair of spaced discs projecting radially therefrom, said discs converging from adjacent the hub toward their peripheries and flaring adjacent their rims to form an open bottom groove; a load line secured between said discs to wind on the hub when the wheel is rotated and hanging free through the open bottom of said groove; and flexible means engaging said groove for rotating the wheel in either direction.

References Cited in the file of this patent

UNITED STATES PATENTS

| Number | Name | Date |
|---|---|---|
| 69,978 | Finnegan | Oct. 22, 1867 |
| 199,400 | Beach | Jan. 22, 1878 |
| 411,086 | Batt | Sept. 17, 1889 |
| 505,782 | Waters | Sept. 26, 1893 |
| 1,149,677 | Parker | Aug. 10, 1915 |
| 1,362,362 | Steenstrup | Dec. 14, 1920 |
| 2,285,791 | Auslander | June 9, 1942 |
| 2,374,111 | Le Tourneau | Apr. 17, 1945 |
| 2,466,688 | Culver | Apr. 12, 1949 |

FOREIGN PATENTS

| Number | Country | Date |
|---|---|---|
| 2,737 | Great Britain | of 1863 |
| 541 | Great Britain | of 1877 |
| 2,317 | Great Britain | of 1882 |